(12) United States Patent
Seo

(10) Patent No.: US 11,436,956 B2
(45) Date of Patent: Sep. 6, 2022

(54) METHOD AND APPARATUS FOR RELEASING HUD PROTECTION MODE BASED ON VEHICLE INFORMATION

(71) Applicant: HYUNDAI MOBIS CO., LTD., Seoul (KR)

(72) Inventor: Hak Yong Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/131,368

(22) Filed: Dec. 22, 2020

(65) Prior Publication Data

US 2022/0122498 A1 Apr. 21, 2022

(30) Foreign Application Priority Data

Oct. 21, 2020 (KR) .......................... 10 2020 0136907

(51) Int. Cl.
*G09G 3/00* (2006.01)
*B60R 16/023* (2006.01)
(Continued)

(52) U.S. Cl.
CPC ............. *G09G 3/001* (2013.01); *B60K 35/00* (2013.01); *B60R 16/023* (2013.01);
(Continued)

(58) Field of Classification Search
CPC ................ G02B 27/01; G02B 27/0101; G02B 27/0149; G02B 5/281; G02B 2027/0118;
(Continued)

(56) References Cited

U.S. PATENT DOCUMENTS 9,423,615 B2  8/2016 Sato et al.
2014/0062777 A1* 3/2014 MacGougan ........... G01S 19/26
                                                    342/357.43
(Continued)

FOREIGN PATENT DOCUMENTS

DE  102017206805  10/2018
DE  102019122177  3/2020
(Continued)

OTHER PUBLICATIONS

German Office Action dated Mar. 4, 2021, issued to the German Patent Application No. 102020134545.

*Primary Examiner* — Christopher E Leiby
(74) *Attorney, Agent, or Firm* — H.C. Park & Associates, PLC

(57) ABSTRACT

Disclosed herein are a head-up display (HUD) including a photosensor for measuring the illuminance of incoming light and a light shutter in order to protect an imaging element vulnerable to thermal damage from sunlight reaching from the outside, and a method including setting the HUD protection mode by operating the light shutter, determining whether to release the HUD protection mode by estimating the change in the incident angle of the incoming light from the change in the vehicle orientation angle instead of using the photosensor incapable of measuring the light as the incoming light is blocked and additionally determining whether to release the HUD protection mode based on vehicle information including vehicle location, navigation map information, the brightness of surroundings of the vehicle, and rain sensor detection information.

13 Claims, 9 Drawing Sheets

(a)

(b)

(51) Int. Cl.
*G01S 19/42* (2010.01)
*G09G 3/34* (2006.01)
*G09G 3/36* (2006.01)
*G02B 27/01* (2006.01)
*G02B 5/20* (2006.01)
*G01C 21/26* (2006.01)
*G01C 21/36* (2006.01)
*B60K 35/00* (2006.01)

(52) U.S. Cl.
CPC ....... *G01C 21/265* (2013.01); *G01C 21/3667* (2013.01); *G01S 19/42* (2013.01); *G02B 5/208* (2013.01); *G02B 27/0149* (2013.01); *G09G 3/3406* (2013.01); *G09G 3/36* (2013.01); *B60K 2370/12* (2019.05); *B60K 2370/1529* (2019.05); *B60K 2370/166* (2019.05); *B60K 2370/23* (2019.05); *B60K 2370/52* (2019.05); *G09G 2330/04* (2013.01); *G09G 2360/144* (2013.01); *G09G 2380/10* (2013.01)

(58) Field of Classification Search
CPC ............ G02B 2027/0112; G02B 5/208; G02F 1/133555; G02F 1/133528; G02F 1/13306; G02F 1/133603; G09G 3/3406; G09G 3/001; G09G 3/36; G09G 2360/144; G09G 2330/04; G09G 2380/10; G01J 1/42; B60K 35/00; B60K 2370/1529; B60K 2370/166; B60K 2370/12; B60K 2370/52; B60K 2370/23; B60R 16/023; G01C 21/265; G01C 21/3667; G01S 19/42
See application file for complete search history.

(56) References Cited

U.S. PATENT DOCUMENTS

| | | | |
|---|---|---|---|
| 2014/0132852 A1* | 5/2014 | Pawusch | G02B 27/0149 349/11 |
| 2016/0299234 A1* | 10/2016 | Zeng | G01S 19/42 |
| 2016/0362118 A1 | 12/2016 | Mollicone et al. | |
| 2017/0139206 A1* | 5/2017 | Sugikawa | G02B 27/0101 |
| 2020/0130622 A1* | 4/2020 | Lerner | B60K 37/06 |
| 2020/0220888 A1* | 7/2020 | Terazawa | B60T 8/88 |
| 2021/0031776 A1* | 2/2021 | Shibata | B60W 50/08 |
| 2021/0146823 A1* | 5/2021 | Pomish | B60Q 1/1415 |

FOREIGN PATENT DOCUMENTS

| | | |
|---|---|---|
| JP | 2005331624 | 12/2005 |
| JP | 2013-224068 | 10/2013 |
| JP | 6135048 | 5/2017 |
| JP | 2017-190000 | 10/2017 |
| JP | 2018205334 | 12/2018 |
| JP | 2019089436 | 6/2019 |
| JP | 2019163006 | 9/2019 |
| JP | 2020-052070 | 4/2020 |
| KR | 10-2010-0051938 | 5/2010 |

\* cited by examiner (a)

(b)

(a)

(b)

METHOD AND APPARATUS FOR RELEASING HUD PROTECTION MODE BASED ON VEHICLE INFORMATION

CROSS-REFERENCE TO RELATED APPLICATION

This application claims priority to and the benefit of Korean Patent Application No. 10-2020-0136907, filed on Oct. 21, 2020, the disclosure of which is incorporated herein by reference in its entirety.

BACKGROUND OF THE INVENTION

1. Field of the Invention

The present disclosure relates to a method and apparatus for releasing a protection mode of a head-up display (HUD). More specifically, the present disclosure relates to a method and apparatus for determining whether to release a protection mode of the HUD based on vehicle information, without relying further on the measurement of incident sunlight after the protection mode is set to block the sunlight to prevent any thermal damage of an image output component inside the HUD.

2. Description of the Related Art

The statements in this section merely provide background information related to the present disclosure and may not constitute prior art.

The head-up display is a device providing a driver with travel information of a vehicle for safe driving. A picture generation unit (PGU), which is an image output component, generates an image containing the travel information. The generated image passes through an optical system to be projected onto a vehicle windshield, or a translucent reflection screen disposed inside the vehicle.

Sunlight 100 reaching through the vehicle windshield within a specific angular range may trace the HUD's optical path, substantially condensed and eventually going to the PGU with a much reduced cross-sectional area (see FIG. 1). In other words, the sunlight 100 is incident on the PGU with greatly amplified heat energy density. The PGU may include a liquid crystal display (LCD) element, a liquid crystal on silicon (LCoS) element, or a digital light processing (DLP) element as an imaging element 12. Those imaging elements are vulnerable to over-heating and may thus be deformed or damaged when exposed to the sunlight 100 over a certain period.

The HUD may include a light shutter configured to prevent thermal damage to the imaging element. A photosensor configured to measure the illuminance of the incident light may be included inside the HUD. When the measured illuminance of the light exceeds a threshold, the light shutter may operate to block the incident light from reaching the imaging element in a protection mode (See Patent Document 0001, and (b) in FIG. 2).

One way to prevent thermal damage to the imaging element is to reduce a light output of a backlight unit (BLU) (not shown) in the PGU when the protection mode is set, weakening the heat energy onto the imaging element instead of physically blocking the incident light by a light shutter (See Patent Document 0002).

Reducing the light output of the BLU may be conveniently implemented because it does not require an additional moving part. However, such a method may not work for a large-screen HUD having a bigger projection image with a higher magnification from the base image in the PGU. A larger projection area also means a broader angle of incident sunlight, which may cause thermal damage. In the large-screen HUD, sunlight that passes through the vehicle windshield and enters the HUD becomes more considerable in amount and more condensed. Thus the sunlight may be incident on the imaging element at a high thermal energy density. In this case, thermal damage may occur even when the BLU's light output is shut off.

When the light shutter is employed, the photosensor may be preferably disposed of in front of the light shutter toward the incident light. This is because the illuminance must be measured even when the light shutter is in operation, blocking the incident light. However, in the case of the large screen HUD, a projection area is so large at a position closer to the screen that multiple photosensors may be needed to determine the harmful incident light over the entire screen region. Further, the angle of the incident may be better determined after the light passes through at least some optical elements. After the sunlight passes through a plurality of optical elements, and thus the cross-sectional area of the incident light is reduced, the incidence angle may be more easily determined. Therefore, the photosensor is preferable to be disposed of adjacent to the imaging element, such as the PGU.

On the other hand, the light shutter is better to be disposed of at a position farther from the imaging element on an optical path. This is because a smaller amount of the incident light may be allowed to enter the HUD, and the incident light on the blocking light shutter may be less condensed, which may lead to a lower density of thermal energy on the light shutter and a smaller amount of heat transfer from the light shutter to the imaging element.

A cold mirror 22 may also be used as an optical element in disposing the photosensor on the optical path. The cold mirror 22 is, for example, an optical element configured to pass infrared light and reflect visible light. Placing the photosensor 30 behind the cold mirror 22 may allow the illuminance of light (the infrared light) transmitted along the optical path to be measured.

In summary, in order to prevent thermal damage to the imaging element, particularly in the large-screen HUD, the light shutter is essential. It is preferable that the light shutter is placed in front of the photosensor toward the entrance of the incident light. When a measured value of the photosensor exceeds a threshold, and thus the protection mode is set, the photosensor is not capable of measuring the incident light. Therefore, such an arrangement requires additional means to determine whether to release the protection mode or not.

When the photosensor is not in operation condition (see (b) in FIG. 2), the release of the protection mode may be attempted for the photosensor to re-measure the illuminance of the incident light after a certain period. However, this scheme may cause frequent physical operations of the light shutter, and it is not efficient.

In some cases, the photosensor 30' may be placed adjacent to the top of the HUD and is thus substantially disposed outside the HUD such that the photosensor may measure the illuminance at all times. However, it is difficult to determine accurately whether the sunlight is incident at an angle at which the imaging element gets the thermal damage (See FIG. 3).

In order to determine whether to set or release the protection mode, vehicle position information from a global positioning system (GPS) may be incorporated and be used for estimating the incidence angle of the sunlight. However, the GPS has low reliability in terms of the determination of the incidence direction of the sunlight as the GPS may contain reception delay and a position error. Further, locational information that may be related to the presence of the harmful incident light, such as high-rise buildings, mountains, or tunnels, including a broadcasted weather information at the vehicle location, is not recognizable with the simple position information.

SUMMARY OF THE INVENTION

Therefore, the present disclosure has been made in view of the above problems, and it is an object of the present disclosure to provide a method and apparatus for releasing a HUD protection mode for a HUD, including a light shutter configured to block external incident sunlight that may cause thermal damage to an image output unit in the HUD, wherein, when the illuminance of the incident light measured by the photosensor arranged inside the HUD exceeds a threshold, the HUD protection mode is set, and subsequent vehicle movement and change in vehicle orientation is determined from vehicle information based on the sunlight incidence angle and the vehicle position angle at the time when the protection mode is set to determine whether to release the protection mode to minimize the unnecessary operation of the light shutter and provide travel information to a driver over sufficient duration.

In accordance with an aspect of the present disclosure, the above and other objects can be accomplished by the provision of a head-up display (HUD) including: a picture generation unit (PGU) including an imaging element configured to generate an image and a back light unit (BLU) configured to illuminate light such that the image is projected along a forward optical path; a cold mirror disposed in front of the PGU along the forward optical path and configured to allow infrared rays incident on a front face to be transmitted therethrough and to reflect visible rays incident on the front face; a concave mirror disposed in front of the cold mirror along the forward optical path and configured to be pivotable between a first position and a second position, the concave mirror projecting the image at the first position and blocking incoming light at the second position; a photosensor disposed adjacent to a back face of the cold mirror and configured to measure an illuminance of the incoming light incident along a backward optical path opposite to the forward optical path; a vehicle orientation sensor configured to measure a vehicle orientation angle; and a controller configured to control setting or release of a HUD protection mode based on the illuminance of the incoming light and the vehicle orientation angle, wherein, when the illuminance of the incoming light is greater than or equal to a threshold corresponding to a level of illuminance causing thermal damage to the imaging element, the controller is configured to: record the vehicle orientation angle as a sunlight incidence angle, and control a light shutter to pivot to the second position to set the HUD protection mode; update the sunlight incidence angle from the vehicle orientation angle; and upon determining that the updated sunlight incidence angle is outside a predefined damaging angular range, control a light shutter to pivot to the first position to release the HUD protection mode.

The controller may collect vehicle information through a controller area network (CAN) in a vehicle or Ethernet communication, and additionally determine whether to release the HUD protection mode based on the vehicle information.

The vehicle information may include first vehicle information including information about at least one of a vehicle location, an azimuth, a date, or a time as identified by at least one of a global positioning system (GPS), GLONASS, or Galileo system; and navigation map data in the vehicle.

The navigation map data may include high-definition (HD)-map information, wherein The HD-Map information may include information on at least one of a high-rise building, a high mountain, a tunnel, or an underpass.

The vehicle information may include second vehicle information, including a brightness value measured by an illuminance sensor provided in the vehicle; and/or information about whether a taillight configured to be automatically turned on when a surrounding around the vehicle is dark is turned on.

The vehicle information may include third vehicle information about whether rainfall is detected by a rain sensor.

When the vehicle is expected to enter the tunnel or underpass based on the first vehicle information, the controller is configured to: estimate a time duration required to enter the tunnel or the underpass, based on the vehicle location and a travel speed of the vehicle; and when the required time duration is within a predefined safe time duration for which thermal damage is not caused to the imaging element, release the HUD protection mode.

The safe time duration may be calculated based on the illuminance of the incoming light, such that the safe time duration is set to be longer as the illuminance of the incoming light is weaker.

The controller may periodically acquire the vehicle orientation angle in the HUD protection mode.

The vehicle orientation angle may include a roll angle, a yaw angle, and a pitch angle.

The damaging angular range may be defined as an angular range allowing the incoming light incident and transmitted along the backward optical path to be directly incident on the imaging element while the light shutter is at the first position.

The HUD may further include a manual release means to release the HUD protection mode manually.

When the manual release means operates, the HUD may operate to project the image for a temporary operation duration. It may then be set in the HUD protection mode, wherein the temporary operation duration may be set based on the illuminance of the incoming light at a time to set HUD protection mode, wherein the temporary operation duration may be set to be longer as the illuminance of the incoming light is weaker.

For the temporary operation duration of the HUD, the photosensor may measure the illuminance of the incoming light and update the temporary operation duration based on the illuminance as updated.

In accordance with another aspect of the present disclosure, there is provided a method for releasing a head-up display (HUD) protection mode, the method including: initializing the HUD; setting a HUD normal operation mode; measuring an illuminance of incoming light using a photosensor; determining whether a measured value of the photosensor exceeds a threshold; upon determining that the measured value does not exceed the threshold, repeating the measurement; upon determining that the measured value exceeds the threshold, setting the HUD protection mode; when the HUD protection mode is set, calculating an incidence angle of the incoming light based on a value measured by a vehicle orientation sensor; determining whether the incidence angle of the incoming light is outside a damaging angular range; upon determining that the incidence angle of the incoming light is outside the damaging angular range, releasing the HUD protection mode; upon determining that the incidence angle of the incoming light is within the damaging angular range, performing an additional determination operation of collecting vehicle information and determining whether to release the HUD protection mode; upon determining to release the HUD protection mode in the additional determination operation, releasing the HUD protection mode; and upon determining to defer releasing of the HUD protection mode in the additional determination operation, maintaining the HUD protection mode and repeating the operations subsequent to the setting of the HUD protection mode.

The additional determination may include operations of: collecting first vehicle information from an audio-video navigation (AVN) system, and determining whether the incoming light is incident based on the first vehicle information; determining whether brightness around the vehicle is lowered based on second vehicle information about whether a taillight is turned on; and determining whether rain is falling based on third vehicle information about whether rainfall is detected by a rain sensor, wherein the operations may be performed in parallel, wherein it may be determined to release the HUD protection mode when it is determined in at least one of the operations that an amount of the incoming light has decreased.

The first vehicle information may include: information about at least one of a vehicle location, an azimuth, a date, or a time as identified by at least one of a global positioning system (GPS), GLONASS, or Galileo system; and navigation map data in the vehicle.

The navigation map data may include high-definition (HD)-map information, wherein the HD-Map information may include information on at least one of a high-rise building, a high mountain, a tunnel, or an underpass.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION OF THE INVENTION

Figure 1:
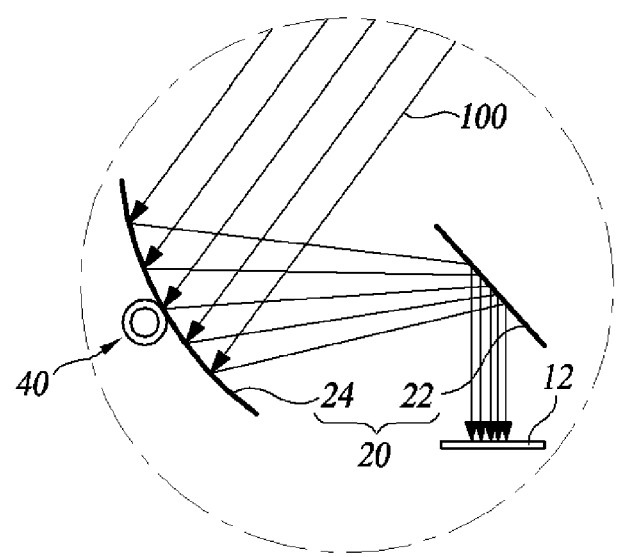
FIG. 1 shows a concept of thermal damage caused to the image output component by sunlight entering a HUD and condensed to high thermal energy.
Figure 2:
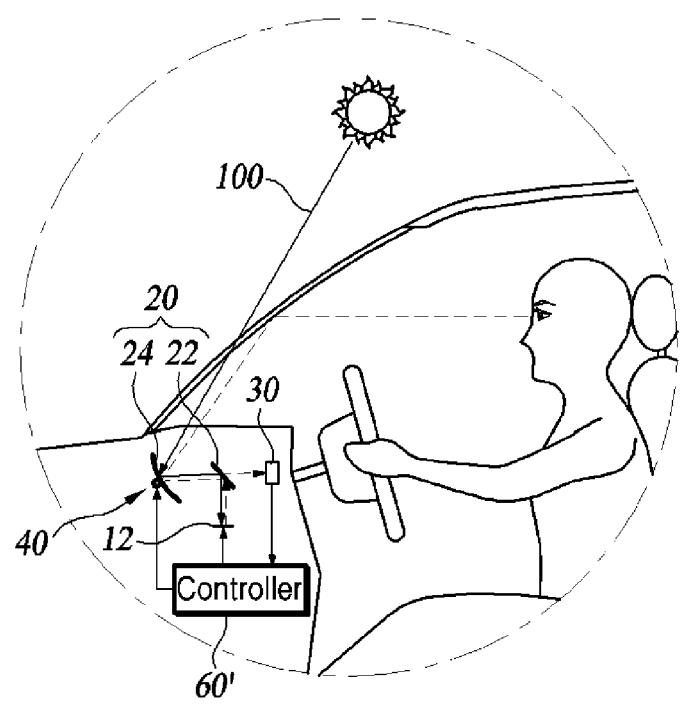
FIG. 2 shows the protection mode operation scheme for a HUD, including a photosensor disposed inside the HUD to measure the illuminance of incoming light and a shutter configured to block the incident light.
Figure 2:
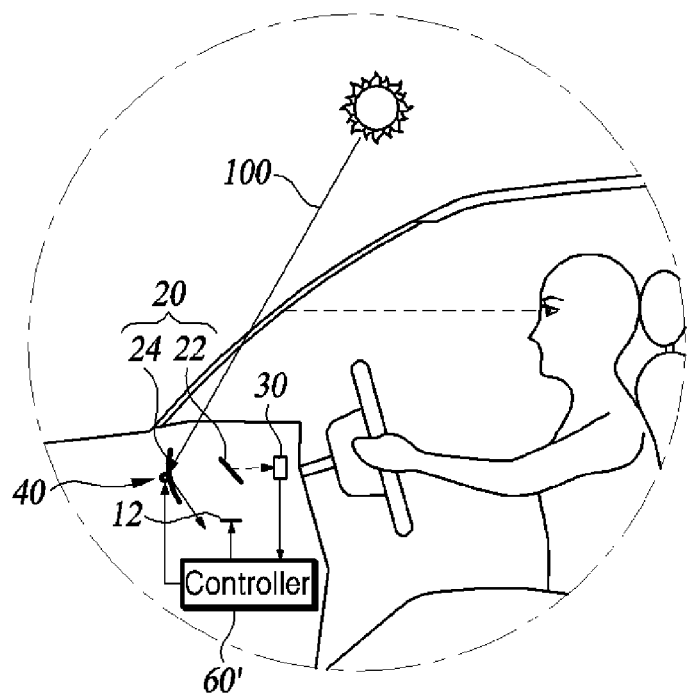
Figure 3:
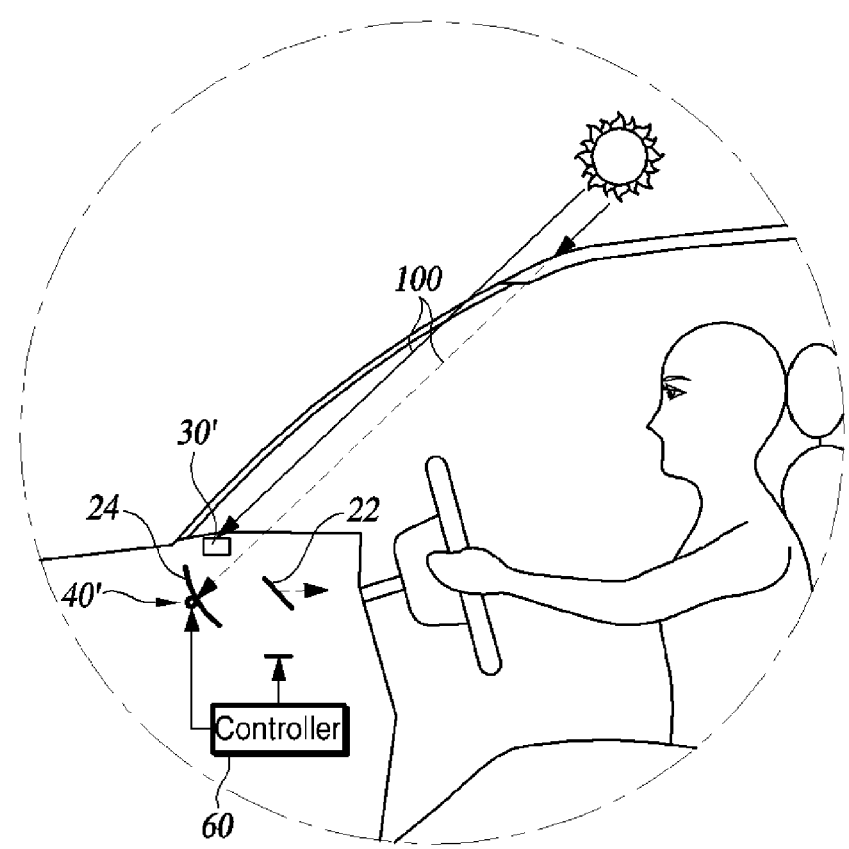
FIG. 3 shows an example of a configuration in which the photosensor to measure the illuminance of the incident light is adjacent to the top of the HUD and is thus disposed substantially outside the HUD.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

Various terms such as first, second, A, B, (a), (b), etc., are used solely for the purpose of differentiating one component from the other but neither imply nor suggest the substances, order or sequence of the components. Throughout this specification, when a part "includes" or "comprises" a component, the part may further include other components, and such other components are not excluded unless there is a particular description contrary thereto. Terms such as "unit," "module," and the like refer to units for processing at least one function or operation, which may be implemented by hardware, software, or a combination thereof.

Figure 4:
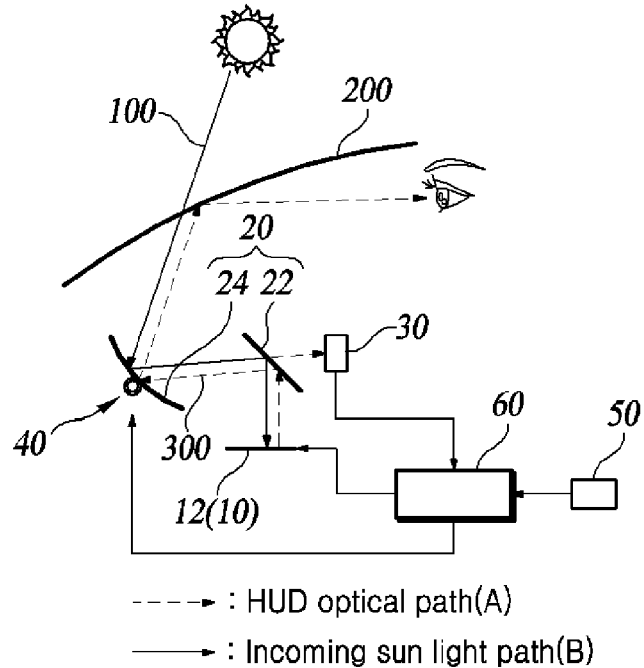
FIG. 4 shows a HUD including a vehicle orientation sensor to determine whether to release the HUD protection mode according to an embodiment of the present disclosure.
Figure 4:
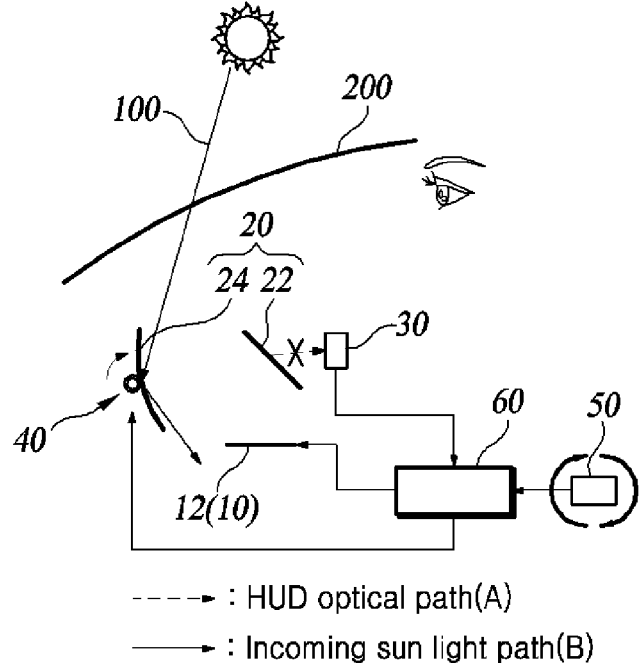

FIG. 4 shows a HUD, including a vehicle orientation sensor to determine whether to release the HUD protection mode according to an embodiment of the present disclosure.

Referring to FIG. 4, a HUD 1 according to an embodiment of the present disclosure includes a picture generation unit (PGU) 10, an optical system 20, a photosensor 30, a light shutter 40, a vehicle orientation sensor 50, and a controller 60. An image generated by the PGU 10 is finally projected onto a windshield 200.

The PGU 10 outputs the image to be projected onto the windshield 200. In the present description, only an example in which the PGU 10 includes an LCD element 12 as an imaging element is presented. However, the disclosure is not limited thereto. The PGU 10 may consist of other types of image projectors, such as a liquid crystal on silicon (LCoS) element and a digital light processing (DLP) element.

The optical system 20 includes optical elements to magnify the image generated by the PGU 10 and project the magnified image onto the windshield of the vehicle. The optical system 20 includes a cold mirror 22, and a concave mirror 24 is configured to be pivotable.

The cold mirror 22 is an optical element configured to allow the light of infrared wavelengths to be transmitted therethrough and reflect the light of visible light wavelengths.

The concave mirror 24 is disposed ahead of the windshield 200 on an optical path 300 along which an image generated by the PGU 10 is transmitted. The concave mirror 24 is configured to be pivotable between a first position and a second position. The image is projected onto the windshield 200 when the concave mirror is at the first position, and the incoming light 100 is blocked when the concave mirror is at the second position.

The photosensor 30 is arranged to measure the illuminance of the incoming light 100. In one embodiment, the photosensor 30 is disposed behind the cold mirror 22.

The photosensor 30 transmits the illuminance information about the incoming light 100 to the controller 60.

The light shutter 40 is configured to block the incoming light 100. In one embodiment, the light shutter 40 is embodied as the concave mirror 24 configured to be pivotable. A separate additional component may be omitted when the concave mirror 24, which is a part of the optical system, is used as the light shutter 40.

In particular, the volume of the large-screen HUD may be minimized to install the HUD in limited vehicle space. Thus, using one of the components of the optical system to block the incoming light 100 is preferable to adding a separate large moving component to block the incoming light 100. The concave mirror 2, which is configured to be pivotable in connection with the rotation of a motor, may perform the light shutting function while saving the HUD system's volume.

The vehicle orientation sensor 50 measures and provides vehicle orientation angles, including a roll angle 410, a yaw angle 420, and a pitch angle 430. The vehicle orientation angles may be measured by an inertia measurement unit (IMU) type vehicle orientation sensor 50, such as a gyro sensor.

The controller 60 compares the illuminance of the incoming light 100 measured by the photosensor 30 with a threshold to control the light shutter 40 to set or release the HUD protection mode. The threshold may be defined as an illuminance at which the light incident on the LCD element 12 of the PGU 10 may cause irreversible damage to the LCD element 12.

In one example, a method for releasing the HUD protection mode according to an embodiment does not exclude a scheme in which a temperature of the LCD element 12 is measured using a temperature sensor (not shown) adjacent to the LCD element 12, and then the set or release of the protection mode is determined based on the temperature of the LCD element 12.

FIG. 4(*a*) shows a state in which the HUD protection mode is released and illustrates that the light shutter 40 is in the first position. FIG. 4(*b*) shows a state in which the HUD protection mode is set and illustrates that the light shutter 40 is in the second position. When the HUD protection mode is set, the optical path is changed such that the sunlight from outside is not transmitted to the PGU 10.

In one embodiment, when the HUD protection mode is set, an optical transmission path of the incoming light 100 is different from an optical transmission path that the image of the PGU 10 is projected therethrough. Further, the incoming light 100 is not measured by the photosensor 30. Therefore, in order to determine whether to release the protection mode in response to a change in the incidence angle of the incoming light 100, different means such as the vehicle orientation sensor 50 according to an embodiment is required.

Figure 5:
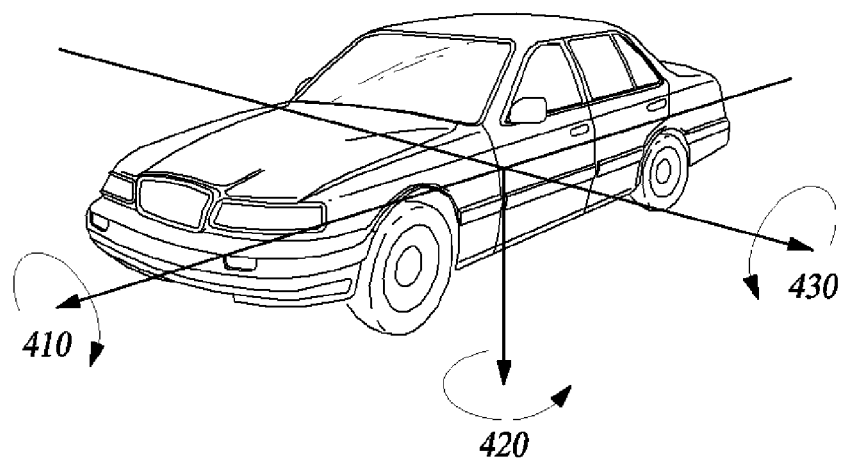
FIG. 5 shows angles measured by the vehicle orientation sensor according to an embodiment of the present disclosure.

FIG. 5 shows angles measured by the vehicle orientation sensor according to an embodiment of the present disclosure.

In one embodiment, the vehicle orientation angles, including the roll angel 410, the yaw angle 420, and the pitch angle 430, as shown in FIG. 5, is continuously measured. A change in vehicle orientation angle with respect to the one at the time of entering a HUD protection mode is used to determine a release condition of a HUD protection mode.

In order to improve the accuracy and speed of measurement of the vehicle orientation angle, steering angle information may be supplementarily used. The steering angle information may be used to determine a movement direction of the vehicle more quickly before the change in the orientation of the vehicle is measured by the vehicle orientation sensor 50. In order to measure the vehicle orientation angle more accurately, a vehicle speed may be used along with the steering angle information.

Figure 6:
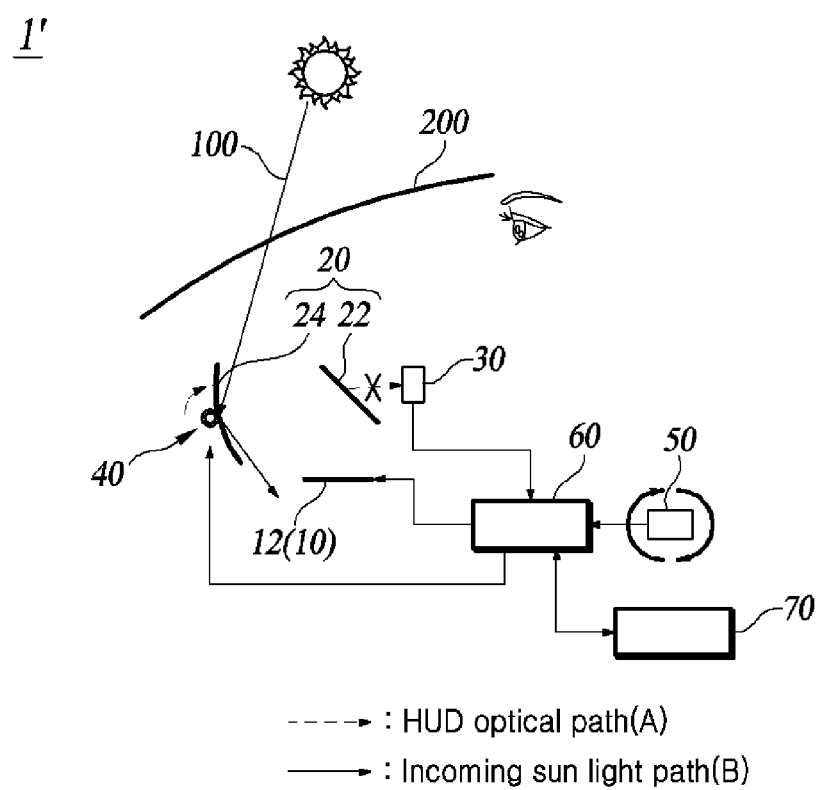
FIG. 6 shows a concept of determining whether external sunlight is incident in an angular range in which thermal damage may be caused to the image output component inside the HUD, based on angles measured from the vehicle orientation sensor according to an embodiment of the present disclosure.

FIG. 6 shows a concept of determining whether external sunlight is incident in an angular range in which thermal damage may be caused to the image output component inside the HUD, based on angles measured from the vehicle orientation sensor according to an embodiment of the present disclosure.

FIG. 6 illustrates a case where the external incident sunlight 100 disappears due to a change in the pitch angle 430 among the vehicle orientation angles.

In one embodiment, whether to release the HUD protection mode is determined based on the change in the vehicle orientation angle. When the vehicle orientation angle is changed due to travel or movement of the vehicle in the HUD protection mode, that is, when it is determined that the sunlight 100 will be incident on the PGU 10 at an angle outside a damaging angular range 500 in which the thermal damage may result in the PGU 10, the controller 60 releases the HUD protection mode.

The controller 60 is configured to control the vehicle orientation sensor 50 to periodically or continuously measure the vehicle orientation angle. The controller 60 determines a vehicle orientation angle C given at the time when the HUD protection mode is set as the sunlight incidence angle and records the roll angle 410, yaw angle 420, and pitch angle 430 corresponding thereto.

While the HUD protection mode is operated, controller 60 continuously detects the vehicle orientation angle according to the vehicle movement and calculates a sunlight incidence angle D by adding the variance $\Delta$C of the angle to the vehicle orientation angle C at the HUD protection mode setting time.

The controller 60 releases the HUD protection mode when it is determined that the sunlight incidence angle D is out of the damaging angular range E 500. On the other hand, when it is determined that the sunlight incidence angle D is within the damaging angular range E, 500, the HUD protection mode is maintained.

The method for releasing HUD protection mode according to an embodiment uses the vehicle orientation sensor 50 capable of continually measuring the orientation of the vehicle regardless of whether the HUD protection mode is set. Thus, the release condition of the HUD protection mode may be determined accurately.

The damaging angular range may be pre-identified and set based on the structure of the optical system of the HUD 1 mounted on the vehicle. The vehicle orientation angles and the damaging angular range 500 include information on the roll angle 410, yaw angle 420, and pitch angle 430. That is, in one embodiment, the sunlight incidence angle D and the damaging angular range E 500 are variables expressed as vectors.

There may be other situations in which the HUD protection mode can be released but cannot be determined only by the information acquired from the vehicle orientation sensor 50. For example, the other situation may include entry to a tunnel/underpass, travel in a high mountain area, travel in an area of high-rise buildings, weather changes (cloudy/rainy), and travel at night.

Figure 7:
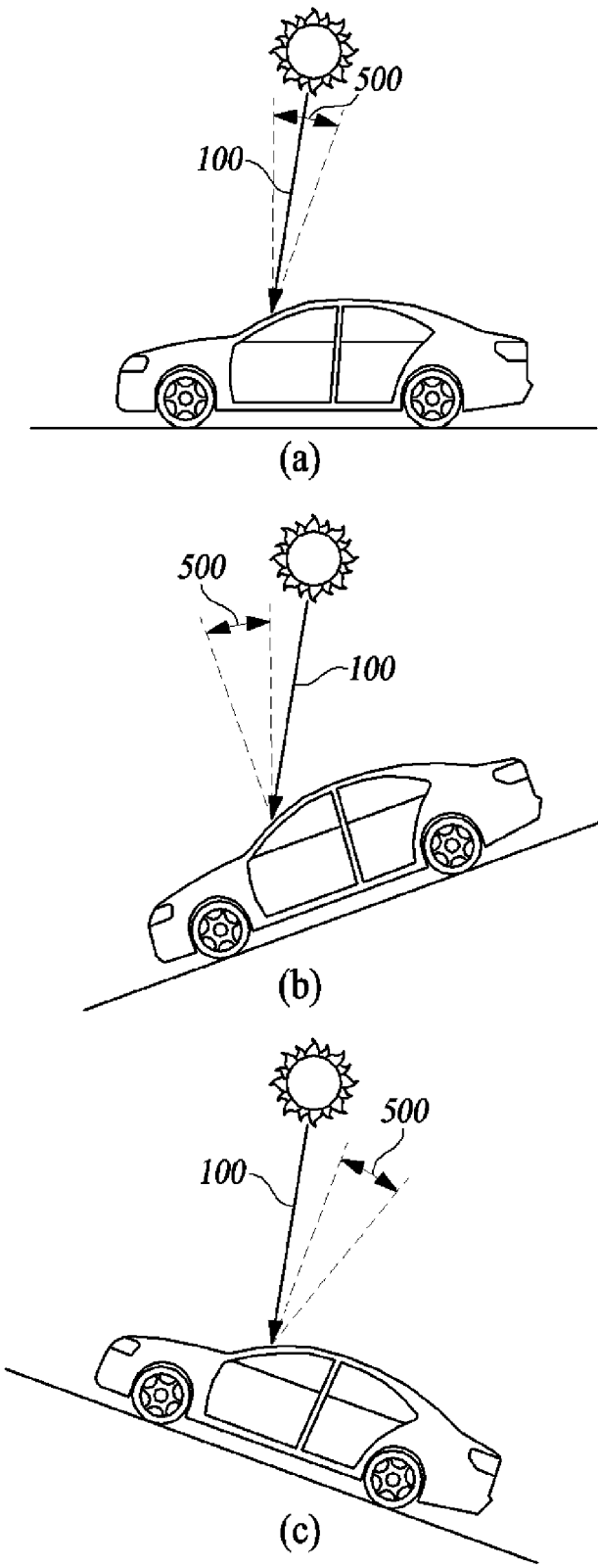
FIG. 7 shows a HUD further including vehicle information to determine whether to release the HUD protection mode according to an additional embodiment of the present disclosure.

FIG. 7 shows a HUD further including vehicle information to determine whether to release the HUD protection mode according to an additional embodiment of the present disclosure.

Vehicle information 70 is further involved in releasing the HUD protection mode according to an additional embodiment of the present disclosure.

The vehicle information 70 includes position information identified by the GPS (or GLONASS, Galileo system) or the like, and navigation map data in the vehicle. The vehicle information 70 may be supplemented by including information about the relative movement of the vehicle obtained by the vehicle orientation sensor 50 in consideration of a case where GPS reception is not normal. Further, a position of the sun calculated based on a date, a time, a location, and an azimuth at the measurement time may be used together with the GPS information to determine whether to release the HUD protection mode. Since the position of the sun gradually changes at a constant speed, precision may be easily secured by repetitive calculation of the position even when a poor GPS reception condition intermittently occurs.

The vehicle information 70 includes information on structures and the terrain around the vehicle that may affect the incidence amount of the sunlight. For example, the vehicle information 70 may include information on high-rise buildings, mountains, and tunnels around the road on which the vehicle travels.

Further, the vehicle information 70 may further include information that may affect the amount of the incident sunlight, such as weather information identified by a terminal mounted on the vehicle. Such information may include brightness around the vehicle detected by an illuminance sensor (not shown), whether a taillight is automatically turned on, or whether rainfall is detected by a rain sensor (not shown). This information may be transmitted to the controller 60 through communication over a controller area network (CAN) in the vehicle or Ethernet communication. Here, the automatic turn-on of the taillight means a case where the front and rear lights are automatically turned on due to darkening around the vehicle.

The controller 60 may release the HUD protection mode when it is determined that the illuminance of the incident sunlight 100 is lowered below a threshold due to the weather and the surrounding environment of the vehicle.

The illuminance sensor measures the brightness around the vehicle under the control of controller 60. The illuminance sensor may measure the brightness around the vehicle using a CdS cell, which is a semiconductor optical sensor based on the photoconductive effect. The illuminance sensor may be installed around the windshield of the vehicle to measure the brightness of a front scene that the driver is looking at. One or more illuminance sensors may be installed as needed. However, the present disclosure is not limited thereto. Various sensors capable of measuring the brightness around the vehicle may be employed.

When the vehicle is expected to enter a tunnel/underpass based on the vehicle information 70 in HUD protection mode, the HUD protection mode may be released before the vehicle enters the tunnel, even when the controller 60 determines that the sunlight 100 is still incident on the HUD. Specifically, the HUD protection mode may be released for a predefined safe time duration for which irreversible thermal damage is not caused to the LCD element 12, considering the vehicle speed and the time required for the vehicle to enter the tunnel. This consideration may minimize the duration for which the travel information is not displayed on the HUD 1 while preventing thermal damage to the LCD element 12.

Whether the vehicle exits out of the tunnel/underpass may be determined based on the vehicle information 70 and the vehicle's travel distance. Further, a travel direction and an expected orientation angle of the vehicle at the exit of the tunnel/underpass may be determined based on the vehicle information 70. The controller 60 may determine the possibility of incidence of the external sunlight 100 on the HUD 1 based on the determined information to determine whether to set the HUD protection mode or to maintain the released state of the HUD protection mode when a certain time elapses after exiting the tunnel/underpass.

It may be important to provide safety-related information to the driver through HUD 1 when entering or exiting the tunnel. The driver's awareness of a situation may deteriorate when entering or exiting the tunnel due to a sudden change in surrounding brightness. Thus there may be a high risk of a collision at this time. Therefore, HUD 1 may operate to provide safety-related information to the driver when the vehicle enters or exits the tunnel.

The method for releasing the HUD protection mode according to an embodiment may keep the information being provided on the HUD 1 when entering or exiting the tunnel/underpass, based on the vehicle information 70, thereby realizing a safer driving environment.

Figure 8:
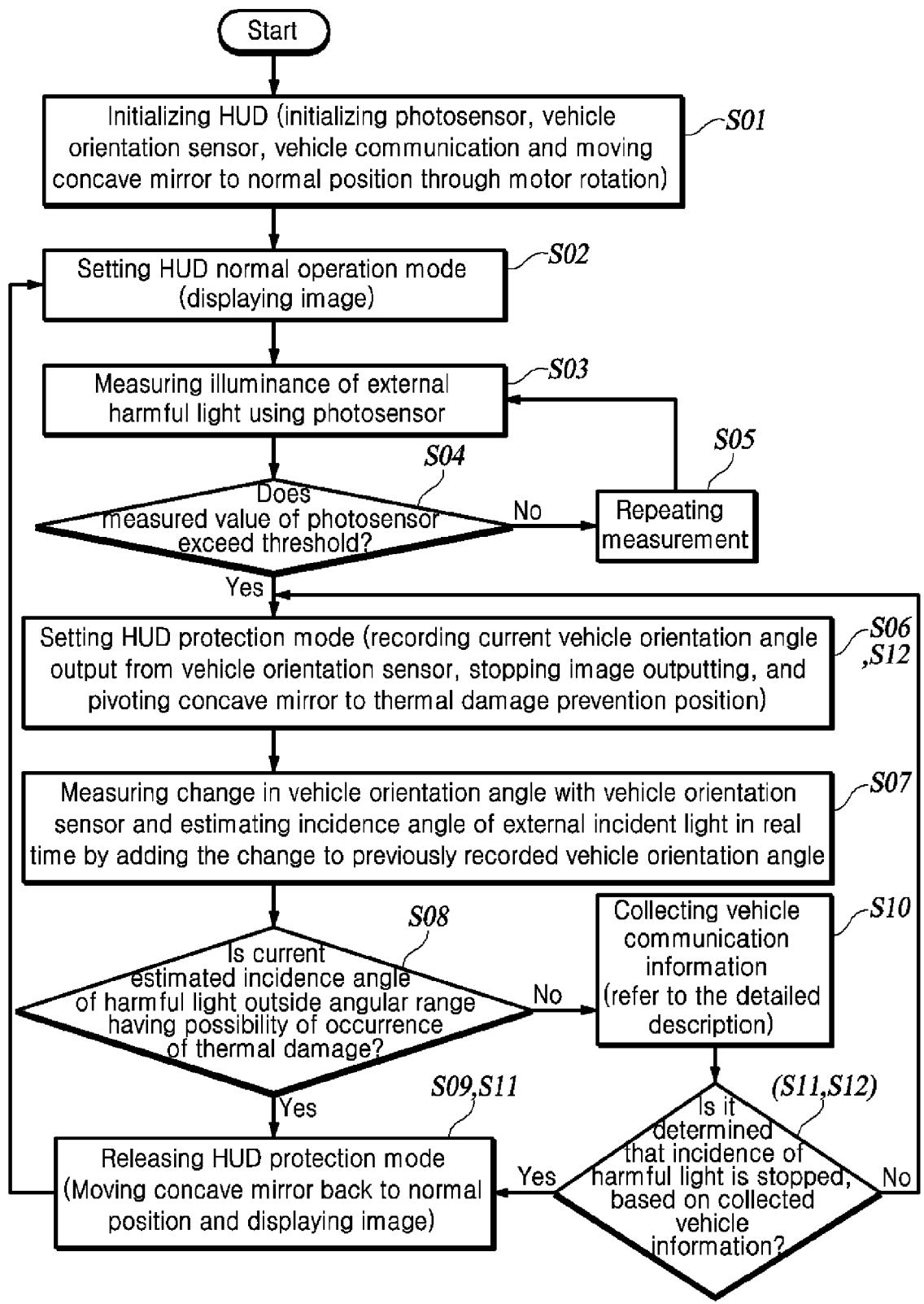
FIG. 8 shows a main control flowchart of the HUD protection mode operation according to an embodiment of the present disclosure.

FIG. 8 shows a main control flowchart of the HUD protection mode operation according to an embodiment of the present disclosure.

Referring to FIG. 8, operations in the HUD protection mode according to an embodiment may include an operation S01 of initializing the HUD; an operation S02 of entering a HUD normal operation mode; a photosensor measurement operation S03 of measuring external harmful light illuminance; a threshold determination operation S04 of determining whether a measured value of the photosensor exceeds a threshold; an operation S05 of repeating the photosensor measurement operation when the measured value of photosensor does not exceed the threshold; an operation S06 of setting the HUD protection mode when the measured value of the photosensor exceeds the threshold; an operation S07 of calculating an incidence angle of the incoming light based on the measured value of the vehicle orientation sensor when the HUD protection mode is set; a damaging angular range determination operation S08 of determining whether the incidence angle of the incoming light is outside a damaging angular range; an operation S09 of releasing the HUD protection mode when the incidence angle of the incoming light is outside the damaging angular range; an additional determination operation S10 of collecting vehicle information when the incidence angle of the incoming light is within the damaging angular range, and determining whether to release the HUD protection mode; an operation S11 of releasing the HUD protection mode upon determining to release the HUD protection mode in the additional determination operation; an operation S12 of maintaining the HUD protection mode and repeating the operations subsequent to the setting of the HUD protection mode when releasing the HUD protection mode is deferred in the additional determination operation. The above operations may be performed sequentially, in parallel, or in a different order.

The HUD initialization operation S01 initializes the photosensor 30, the vehicle orientation sensor 50, the vehicle communication, and the like, and pivots the shutter to a HUD projection mode.

Once the HUD 1 is set in a normal operation mode, an image generated by the PGU 10 is projected onto the windshield.

When the HUD protection mode is set, the vehicle orientation angle measured by the vehicle orientation sensor 50 is recorded, outputting images from the PGU 10 is stopped, and the light shutter 40 is operated.

In the operation S07 of calculating the incidence angle of the incoming light 100, a difference between the vehicle orientation angle at the protection mode setting time and an updated measured value of the vehicle orientation sensor 50 is calculated, and then the difference is estimated as a change in the incidence angle of the incoming light 100.

Figure 9:
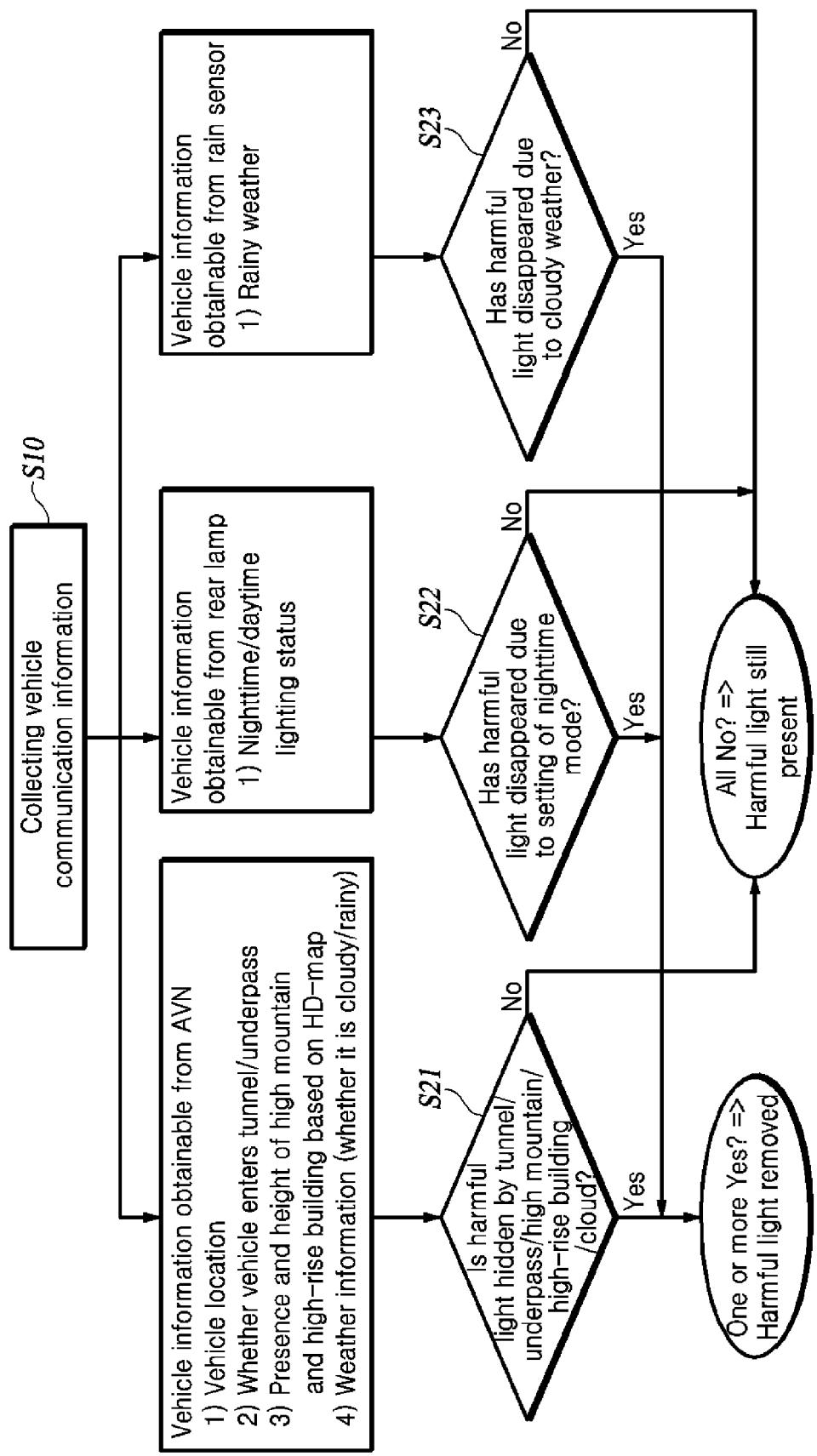
FIG. 9 shows a detailed control flowchart of an additional determination operation of the HUD protection mode operation according to an embodiment of the present disclosure.

FIG. 9 shows a detailed control flowchart of the additional determination operation of the HUD protection mode operation according to an embodiment of the present disclosure.

Referring to FIG. 9, the additional determination operation S10 of HUD protection mode operation according to an embodiment may include an operation S21 of collecting first vehicle information from an audio-video navigation (AVN) system and determining whether the incoming light 100 is incident based on the first vehicle information; an operation S22 of determining whether a brightness around the vehicle is reduced based on second vehicle information about whether a taillight is turned on; and an operation S23 of determining whether rain is falling based on third vehicle information about whether a rain sensor detects rainfall. The above operations may be performed in parallel. When it is determined in at least one of the above operations that the external incident sunlight is removed or the illuminance of the incident sunlight is reduced to a sufficiently low level, the HUD protection mode is released.

The first vehicle information may include vehicle location identified by the GPS or the like, whether the vehicle enters a tunnel/underpass, high mountain or high-rise building information, and weather information. Information on the tunnel/underpass may be obtained from general navigation map information. Information on tall structures around the vehicle, such as high mountains and high-rise buildings, may be obtained from high-definition (HD) map information. Weather information obtained from the AVN system may be used in determining if the sunlight incident on the vehicle becomes weak as the weather becomes cloudy or rainy.

The second vehicle information may include a brightness value measured by the illuminance sensor in the vehicle as described above.

In one example, the HUD protection mode may be configured to be released in other situations, including a manual release by the driver's intention.

In the method for releasing the HUD protection mode according to an embodiment, the HUD operation mode may be intentionally set based on a vehicle engine start state, a battery power supply state (B+, IGN, Engine Start, or the like), or a HUD 1 ON/OFF manual setting function. For example, the manual setting may be similar to a forced short-term operation of a windshield wiper. When the driver operates a relevant input device to operate the HUD 1 in the HUD protection mode, the HUD 1 may be released from the HUD protection mode and operate for a predefined time duration to project the travel information on the windshield. Here, the predefined time duration means a time duration for which thermal damage is not caused to the LCD element 12 even when the incoming light 100 is introduced into the HUD 1. Further, the predefined time duration may be extended or shortened according to the illuminance of the incident light 100 measured by the photosensor 30 at the HUD protection mode setting time. For example, when the incident light 100 is very strong, the duration of the manually released state of the HUD protection mode may be set to be short.

As apparent from the above description, the present disclosure provides the following effects.

According to the embodiments of the present disclosure, harmful light incident on the HUD may be blocked effectively, and the HUD protection mode for protecting an image output component inside the HUD from thermal damage may be set and released efficiently. Accordingly, travel information, including vehicle speed, navigation, blind-spot collision warning (BCW), smart cruise control (SCC), or highway driving assist (HDA) may be provided to the driver as often as possible.

Further, the frequency of operations of the light shutter related to the protection mode may be minimized. This may contribute to reducing power consumption and increasing the service life of the light shutter.

The above description is merely illustrative of the technical idea of the present disclosure, and those of ordinary skill in the art to which the present disclosure belongs will understand that various modifications and variations can be made without departing from the essential characteristics of the present disclosure. Accordingly, the present embodiments are not intended to limit the technical idea of the present exemplary embodiment but are illustrative, and the scope of the technical idea of the present disclosure is not limited by these embodiments. The scope of protection sought for by the present disclosure should be interpreted by the following claims, and all technical ideas within the scope equivalent thereto should be interpreted as being included in the scope of the present disclosure.

What is claimed is:

1. A head-up display (HUD) comprising:
   a picture generation unit (PGU) including an imaging element configured to generate an image and a backlight unit (BLU) configured to illuminate light such that the image is projected along a forward optical path;
   a cold mirror disposed in front of the PGU along the forward optical path and configured to allow infrared rays incident on a front face to be transmitted therethrough and to reflect visible rays incident on the front face;
   a concave mirror disposed in front of the cold mirror along the forward optical path and configured to be pivotable to between a first position and a second position, the concave mirror projecting the image at the first position and blocking incoming light at the second position, working as a light shutter;
   a photosensor disposed adjacent to a back face of the cold mirror and configured to measure an illuminance of the incoming light incident along a backward optical path opposite to the forward optical path;
   a vehicle orientation sensor configured to measure a vehicle orientation angle including a roll angle, a yaw angle and a pitch angle; and
   a controller configured to control setting or release of a HUD protection mode based on the illuminance of the incoming light and the vehicle orientation angle,
   wherein, when the illuminance of the incoming light is greater than or equal to a threshold corresponding to a level of illuminance causing thermal damage to the imaging element, the controller is configured to:
record the vehicle orientation angle and control the light shutter to pivot to the second position to set the HUD protection mode at a HUD protection mode setting time; and wherein the controller is configured to control the light shutter to pivot to the first position to release the HUD protection mode based on the difference between the vehicle orientation angle at the HUD protection mode setting time and a current angle measured by the vehicle orientation sensor,
wherein, when the vehicle is expected to enter a tunnel or underpass, the controller is configured to:
estimate a time duration required to enter the tunnel or the underpass, based on a vehicle location and a travel speed of the vehicle; and
when the required time duration is within a predefined safe time duration for which thermal damage is not caused to the imaging element, release the HUD protection mode.

2. The HUD of claim 1, wherein the controller collects vehicle information through a controller area network (CAN) in a vehicle or Ethernet communication, and additionally determines whether to release the HUD protection mode based on the vehicle information.

3. The HUD of claim 2, wherein the vehicle information includes first vehicle information including:
information about at least one of a vehicle location, an azimuth, a date, or a time as identified by at least one of a global positioning system (GPS), GLONASS, or Galileo system; and
navigation map data in the vehicle.

4. The HUD of claim 3, wherein the navigation map data includes high-definition (HD)-map information,
wherein the HD-Map information includes information on at least one of a high-rise building or a high mountain.

5. The HUD of claim 2, wherein the vehicle information includes second vehicle information including:
a brightness value measured by an illuminance sensor provided in the vehicle; and/or
information about whether a taillight configured to be automatically turned on when a surrounding around the vehicle is dark is turned on.

6. The HUD of claim 2, wherein the vehicle information includes third vehicle information about whether rainfall is detected by a rain sensor.

7. The HUD of claim 1, wherein the safe time duration is calculated based on the illuminance of the incoming light, such that the safe time duration is set to be longer as the illuminance of the incoming light is weaker.

8. The HUD of claim 1, wherein the controller periodically acquires the vehicle orientation angle in the HUD protection mode.

9. A head-up display (HUD), comprising:
a picture generation unit (PGU) including an imaging element configured to generate an image and a backlight unit (BLU) configured to illuminate light such that the image is projected along a forward optical path;
a cold mirror disposed in front of the PGU along the forward optical path and configured to allow infrared rays incident on a front face to be transmitted therethrough and to reflect visible rays incident on the front face;
a concave mirror disposed in front of the cold mirror along the forward optical path and configured to be pivotable to between a first position and a second position, the concave mirror projecting the image at the first position and blocking incoming light at the second position, working as a light shutter;
a photosensor disposed adjacent to a back face of the cold mirror and configured to measure an illuminance of the incoming light incident along a backward optical path opposite to the forward optical path;
a vehicle orientation sensor configured to measure a vehicle orientation angle including a roll angle, a yaw angle and a pitch angle;
a controller configured to control setting or release of a HUD protection mode based on the illuminance of the incoming light and the vehicle orientation angle; and
a manual release means to manually release the HUD protection mode,
wherein, when the illuminance of the incoming light is greater than or equal to a threshold corresponding to a level of illuminance causing thermal damage to the imaging element, the controller is configured to:
record the vehicle orientation angle and control the light shutter to pivot to the second position to set the HUD protection mode at a HUD protection mode setting time; and
control the light shutter to pivot to the first position to release the HUD protection mode based on the difference between the vehicle orientation angle at the HUD protection mode setting time and a current angle measured by the vehicle orientation sensor.

10. The HUD of claim 9, wherein, when the manual release means operates, the HUD operates to project the image for a temporary operation duration, and is then set in the HUD protection mode,
wherein the temporary operation duration is set based on the illuminance of the incoming light at a time to set HUD protection mode,
wherein the temporary operation duration is set to be longer as the illuminance of the incoming light is weaker.

11. The HUD of claim 10, wherein, for the temporary operation duration of the HUD, the photosensor measures the illuminance of the incoming light, and updates the temporary operation duration based on the illuminance as updated.

12. A head-up display (HUD) comprising:
a picture generation unit (PGU) including an imaging element configured to generate an image and a backlight unit (BLU) configured to illuminate light such that the image is projected along a forward optical path;
a cold mirror disposed in front of the PGU along the forward optical path and configured to allow infrared rays incident on a front face to be transmitted therethrough and to reflect visible rays incident on the front face;
a concave mirror disposed in front of the cold mirror along the forward optical path and configured to be pivotable to between a first position and a second position, the concave mirror projecting the image at the first position and blocking incoming light at the second position, working as a light shutter;
a photosensor disposed adjacent to a back face of the cold mirror and configured to measure an illuminance of the incoming light incident along a backward optical path opposite to the forward optical path;
a vehicle orientation sensor configured to measure a vehicle orientation angle; and a controller configured to control setting or release of a HUD protection mode based on the illuminance of the incoming light and the vehicle orientation angle, wherein, when the illuminance of the incoming light is greater than or equal to a threshold corresponding to a level of illuminance causing thermal damage to the imaging element, the controller is configured to:

record the vehicle orientation angle as a sunlight incidence angle, and control the light shutter to pivot to the second position to set the HUD protection mode;

update the sunlight incidence angle from the vehicle orientation angle; and upon determining that the updated sunlight incidence angle is outside a predefined damaging angular range, control the light shutter to pivot to the first position to release the HUD protection mode, wherein the vehicle information includes first vehicle information including:

information about at least one of a vehicle location, an azimuth, a date, or a time as identified by at least one of a global positioning system (GPS), GLONASS, or Galileo system; and navigation map data in the vehicle, wherein the navigation map data includes high-definition (HD)-map information, and wherein the HD-Map information includes information on at least one of a high-rise building, a high mountain, a tunnel, or an underpass, wherein, when the vehicle is expected to enter the tunnel or underpass based on the first vehicle information, the controller is configured to:

estimate a time duration required to enter the tunnel or the underpass, based on the vehicle location and a travel speed of the vehicle; and when the required time duration is within a predefined safe time duration for which thermal damage is not caused to the imaging element, release the HUD protection mode.

13. A head-up display (HUD) comprising:

a picture generation unit (PGU) including an imaging element configured to generate an image and a backlight unit (BLU) configured to illuminate light such that the image is projected along a forward optical path;

a cold mirror disposed in front of the PGU along the forward optical path and configured to allow infrared rays incident on a front face to be transmitted therethrough and to reflect visible rays incident on the front face;

a concave mirror disposed in front of the cold mirror along the forward optical path and configured to be pivotable to between a first position and a second position, the concave mirror projecting the image at the first position and blocking incoming light at the second position, working as a light shutter;

a photosensor disposed adjacent to a back face of the cold mirror and configured to measure an illuminance of the incoming light incident along a backward optical path opposite to the forward optical path;

a vehicle orientation sensor configured to measure a vehicle orientation angle;

a controller configured to control setting or release of a HUD protection mode based on the illuminance of the incoming light and the vehicle orientation angle; and a manual release means to manually release the HUD protection mode, wherein, when the illuminance of the incoming light is greater than or equal to a threshold corresponding to a level of illuminance causing thermal damage to the imaging element, the controller is configured to:

record the vehicle orientation angle as a sunlight incidence angle, and control the light shutter to pivot to the second position to set the HUD protection mode;

update the sunlight incidence angle from the vehicle orientation angle; and upon determining that the updated sunlight incidence angle is outside a predefined damaging angular range, control the light shutter to pivot to the first position to release the HUD protection mode.

* * * * *